Oct. 8, 1968  B. R. ANKERSON  3,404,643
INCINERATORS
Filed Dec. 15, 1966  2 Sheets-Sheet 2

INVENTOR.
BORGE RICHARD ANKERSON
BY

HIS ATTORNEYS

United States Patent Office 3,404,643
Patented Oct. 8, 1968

3,404,643
INCINERATORS
Borge Richard Ankerson, 2420 Private Drive,
Lake Angelus, Pontiac, Mich. 48055
Filed Dec. 15, 1966, Ser. No. 602,019
5 Claims. (Cl. 110—10)

ABSTRACT OF THE DISCLOSURE

An incinerator for garbage is provided with a rotatable hearth with a central well portion, means for rotating said hearth, air inlet means into the hearth, means for delivering air under pressure to the air inlet means, roof means over the hearth, hopper means between said roof means and hearth receiving refuse and continuously discharging refuse to the hearth, means for selectively delivering a gaseous combustion agent to the hearth and means in the well for discharging liquid products of combustion.

---

This invention relates to incinerators and methods of incineration and particularly to an incinerator structure which operates at high temperatures to produce a fused residue or ash and which is smaller, more efficient and less costly to build and operate than incinerators now being used.

Existing type of incinerating plants are very large and costly to build and very inefficient in operation. They employ a large number of men to operate large, inefficient furnaces, which do a poor job of burning the refuse charged into them, leaving a large percentage of ashes containing substantial portions of completely unburned materials which when deposited on nearby ash dumps attract rats and other vermin as was the case with the garbage dumps which preceded the ash dumps. In nearly all of these plants, the standard practice is to have the garbage trucks dump their loads into a receiving pit large enough to hold one to two days' production for the entire plant—in most cases 1000 to 2000 tons of raw, rotting, smelling garbage. From the pit, overhead cranes with large grabbuckets will pick the mixed refuse and load it into the charging hoppers of the furnaces, which require continual manual attention and stoking to perform an even passable job of destroying the refuse.

To handle the ashes and other residue, long, complicated systems of quenching troughs and conveyors with separators and with a large number of men attending these are continually being kept in operation. Maintenance and operating costs on these plants are quite high.

The object of this invention is to eliminate all of these difficulties and at the same time produce a completely clean, sanitary, even sterile residue material, which can be sold for many useful purposes such as road material and building blocks. Another object is to eliminate the highly unsanitary and unhealthy fly-ashes and fumes issuing from the stacks of the old style incinerators and also to eliminate the need for storing and re-handling the refuse and garbage once it has been received at the plant, thus also eliminating the breeding places for rats and eliminating the undesirable odors so commonly emanating from the old style plants.

Still another object of this invention is to provide a facility in which the heat energy from the burning refuse can be converted into steam and/or electric energy at the lowest possible expenditure of additional equipment and at the highest possible rate of efficiency.

A further object of the invention is to provide means for handling any and all sizes and types of refuse material received from the garbage collection trucks of an urban area which might range from ordinary kitchen refuse to dead domestic animals, rubber tires to refrigerators, stoves and hot water heaters and parts of automobiles—all without previous preparation such as shredding, chopping, dismantling or drying.

Preferably, I provide a rotatable hearth having a central well portion, means for rotating said hearth, air inlets into said central well, means for delivering air to said inlets, roof means over said hearth, said roof having an outlet for combustion gases, hopper means between said roof and hearth receiving refuse to be burned and continuously delivering said refuse into the hearth, means for selectively delivering a gaseous combustion agent into said well, and means in the well for discharging liquid products from incineration. Preferably quench means are provided receiving the liquid products of incineration to quench and solidify the same into hard usable particles. The hearth is preferably of conical shape and is provided with a peripheral seal between said hearth and roof. Means are preferably provided for supplying air under pressure to said seal.

In the foregoing general statement I have outlined certain objects, purposes and advantages of my invention. Other objects, purposes and advantages will be apparent from a consideration of the following description and the accompanying drawings in which.

Figure 1:
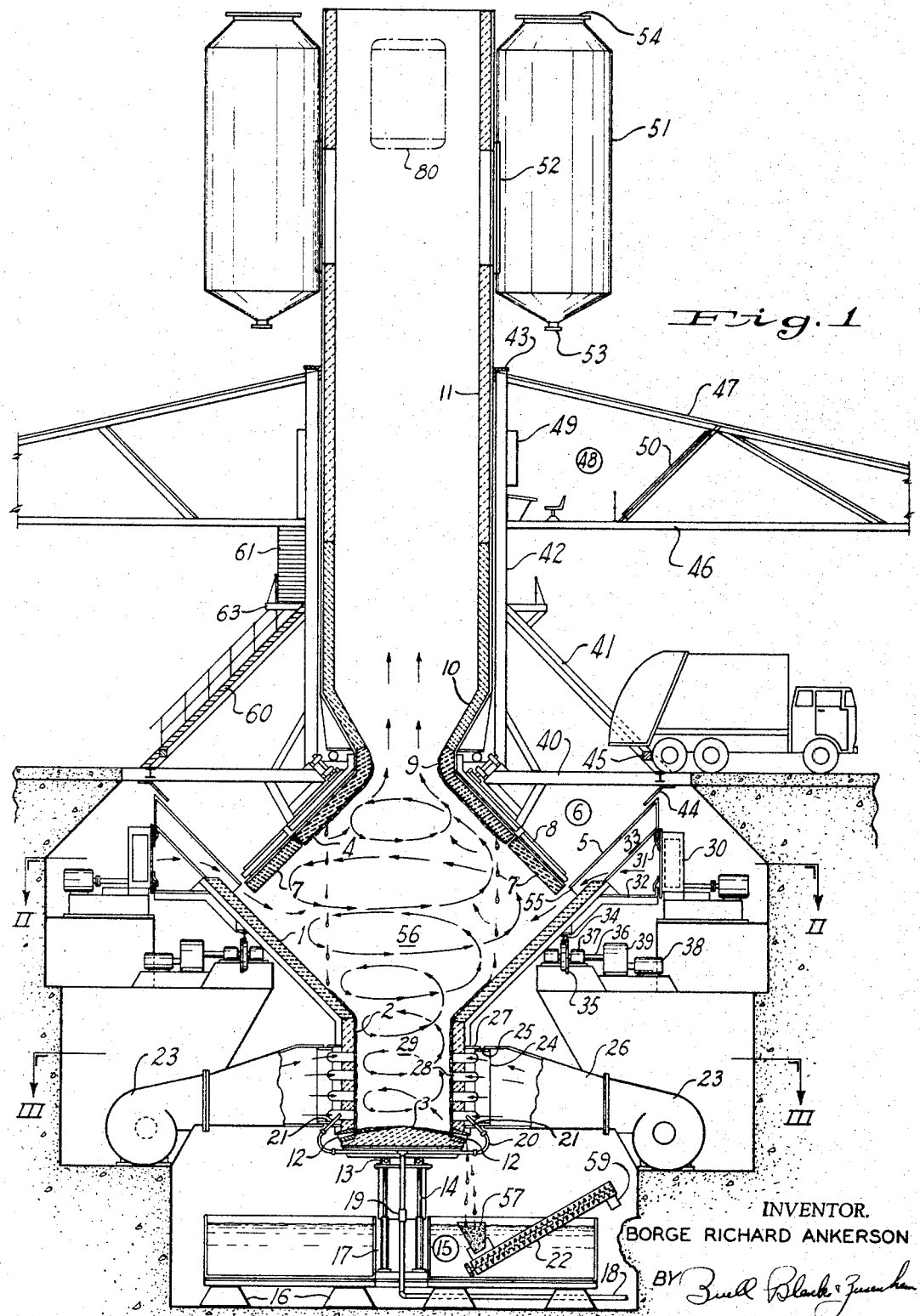
FIGURE 1 is a vertical section through an incinerator according to my invention.
Figure 2:
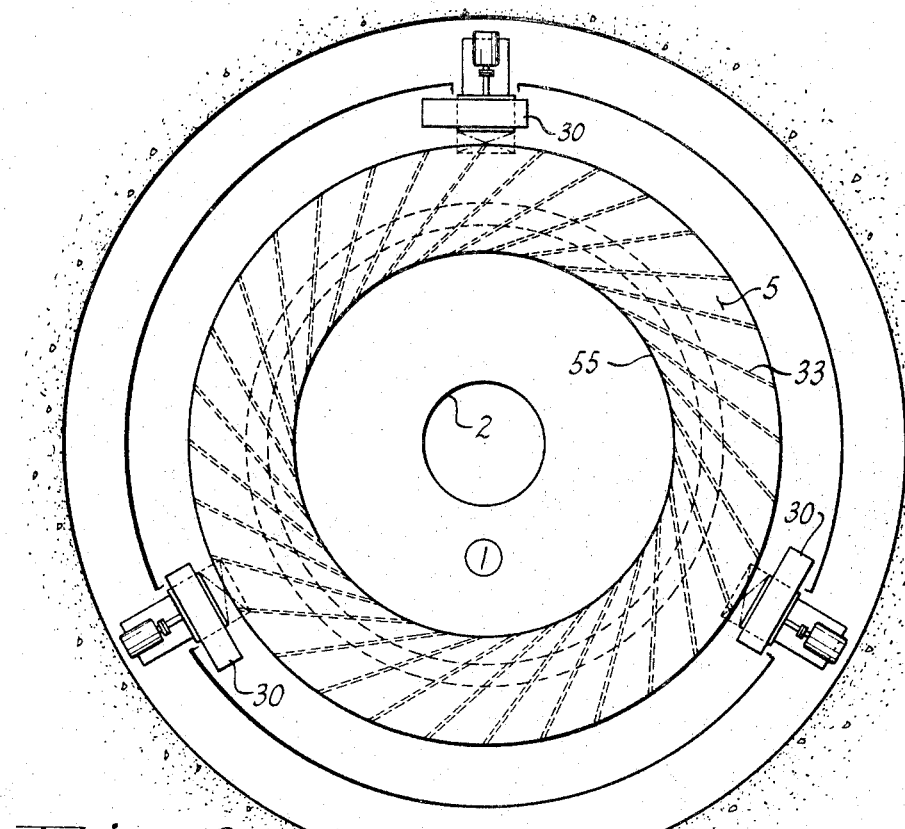
FIGURE 2 is an enlarged section on the line II—II of FIGURE 1.
Figure 3:
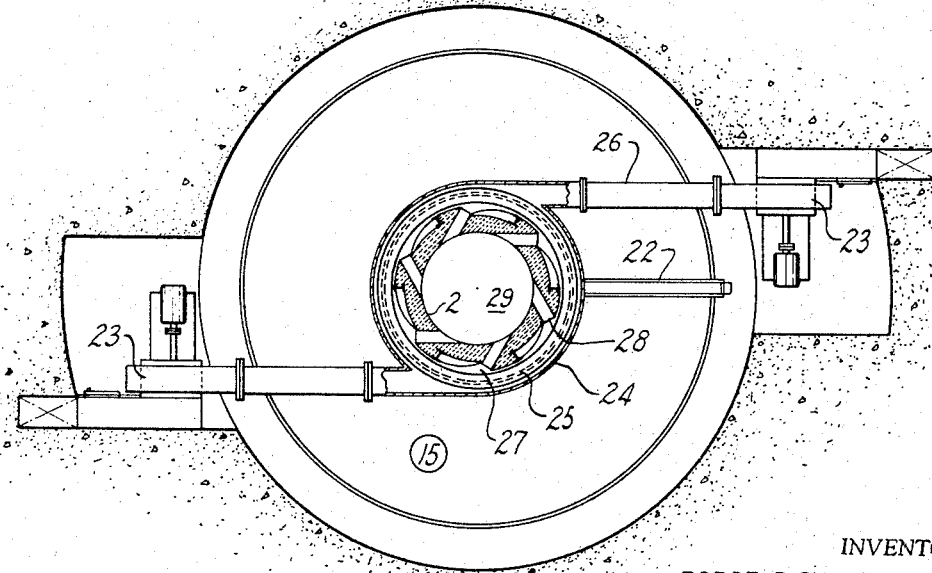
FIGURE 3 is an enlarged section on the line III—III of FIGURE 1.

Referring to the drawings, I have illustrated an incinerator which consists of two basic elements, the hearth 1 and the roof 4 which is independently suspended above the hearth without any direct physical contact with the hearth. The hearth, which is an inverted cone, terminates at its lower end in the cylindrical section 2 with vertical walls and a removable melting hearth 3 at its bottom. The upper edge of hearth 1 is extended outwardly by a cone shaped steel bottom 5 of charging hopper 6.

The bottom edge of roof 4, which is also cone shaped, is comprised of a continuous row of charging doors 7 extending all the way around the circumference of the bottom edge of roof 4. Doors 7 are hinged on shafts 8 permitting each door to be opened and closed independent of the other.

Roof 4 terminates at its upper end in throat section 9, which, together with expansion section 10 at the base of stack 11 forms a venturi tube exhaust system for the exhaust of products of combustion from the furnace below. The refractory lined melting hearth 3 is provided with two tap out blocks 12 and rotatably supported on ball bearing 13 which in turn is resting on hydraulic cylinders 14. Water quench tank 15 is supported on concrete piers 16 and located directly beneath the furnace with its vertical centerline coinciding with that of the furnace above. Through the central opening 17 of quench tank 15 a gas line 18 is extending out into the structural support of melting hearth 3 through quick disconnect coupling 19. Flexible connections 20 connect the gas line 18 to the gas discharge nozzles 21 located in the refractory sidewalls of cylindrical section 2 of the furnace proper.

Combustion air blowers 23 are positioned diametrically opposite with respect to cylindrical section 2 and connected through air ducts 26 to deliver air tangentially into plenum box 24 which is connected through air-tight sliding seals 25 with rotating plenum section 27 to provide air flow through discharge nozzles 28 tangentially introduced at a very high velocity and evenly distributed to the interior of combustion chamber 29.

Agitation blowers 30 are connected through sliding seals 31 and plenum chamber 32 through directional vanes 33 onto the upper section of rotary hearth 1. Circular shaped rail 34 supports the weight of the entire lower section of the furnace on railroad type wheels 35 which, through shafts 36 are supported by bearings 37 and driven by electric motor 38 through gear box 39. Foor beams 40 support stack braces 41 and stack columns 42 the topmost ends of which terminate in a built up angle iron shaped ring section 43 to tie together the top ends of the stack column 42. Guard 44 is attached to the bottomside of the floor beams 40 and steel bumpers 45 are attached between stack braces 41 around the full circumference of the furnace. Roof trusses 46 carrying roof 47 which has a circular shape are supported on stack columns 42 spaced around the stack. Supported within the roof trusses 46 is control room 48 with control panels 49 and control and inspection window 50. Flue gas scrubbers 51 are connected to stack 11 through intake flanges 52 through which hot contaminated flue gases enter the scrubber. Fly ash, suspended in water as sludge, is removed from the scrubber through discharge nozzle 53 and piped to quench tank 15 below for separation and the cleaned and cooled flue gases are discharged to the atmosphere through discharge flange 54 at the top of the scrubbers.

METHODS OF OPERATION

The method of operation of this facility is basically different from the operation of any existing incinerating plant in four very basic and important ways as follows:

(I) *Receiving station for refuse*

In all existing incinerating plants of any consequence the refuse delivered by the Packer trucks is dumped into a large concrete pit some 50′ deep, 50′ wide, and 200′–300′ long for further handling by a number of overhead cranes which, by means of grabbuckets will charge the garbage or refuse into the charging hoppers of the incinerating furnaces as a rule, located side by side at right angles to the length of the pit. Since the furnaces are always built as small as can be tolerated to accommodate the required burning load, it is necessary to keep these furnaces burning at or near top capacity around the clock, 24 hours per day. In order to accomplish this, it is necessary to always maintain a large storage of raw garbage in the pit, particularly over weekends where truck deliveries fall off to almost nil. The result of this procedure is that all of these plants always have anywhere from 1000 to 2000 tons or perhaps more, of smelling, rotting garbage stored adjacent to the truck entrances to the plant, where the wind can blow the dust and odor uninhibitedly out into the neighborhood and where rats and other vermin can find nice, comfortably warm living quarters with plenty of good food to raise large, healthy families which if occasionally chased out of this location can migrate to the ever adjacent ash dumps where warm ashes are continually being dumped containing anywhere from 10 to 30% of moist, unburned, organic materials which serve as excellent food for the rats and other vermin while temporarily in this location.

Unknown quantities of germs and other air pollutants are whirling up into the air in the dust clouds emanating from the Packer trucks as they dump their contents into the pit, however, far greater damage in this respect is being done continually by large crane-buckets as they lift their loads out of the pit and dump them into the charging hoppers of the furnaces and/or in off hours simply lift their loads from one point of the pit to another in an effort to mix the received materials to comprise a more efficiently burnable charge for the furnaces in order to get the highest possible production yield out of the furnaces.

In my facility in a preferred embodiment, the charging hopper 6, which, at the outer edge, is preferably about 50′ to 60′ in diameter; is at the same time the charging hopper for the furnace and also the receiving pit for the trucks to dump their charge into directly from the tipping floor as indicated on the drawing. Under normal operating conditions doors 7 will be partially open during the receiving hours of the plant while trucks are continually arriving and leaving, dumping their contents at one point or another or at several points around the circumference of the continually slowly rotating bottom 5 of the receiving hopper 6. With the hopper continually rotating and the doors partially opened, the bulk loads, dumped at various points of the circumference of the hopper, will gradually be leveled out and gradually be charged into the combustion zone of the furnace by sliding down steel bottom 5 and dropping onto hearth 1 immediately in front of discharge opening 55 between air guides 33. At this point, high velocity air from fan 30 directed tangentially into combustion volume 56 will simultaneously propel the refuse into the volume 56 and provide the necessary air required for complete combustion of the charged refuse while carried on the air stream in suspension through volume 56. Hearth 1 which is lined with high temperature refractory materials and, which during this portion of the operating cycle will be at approximately 2500°–3000° F. will support heavier parts of the charged rubbish as they, by gravity, proceed to the bottom of the furnace while being heated by the hearth and the surrounding furnace volume and at the same time provide it with air from blowers 30 as well as blowers 23 for extremely fast and complete combustion. Aluminum parts or other light metal parts charged in, will during this period, be heated far beyond their melting point and oxidize to become part of the non-combustibles, rapidly melting into slag.

(II) *Slag handling*

Any steel parts charged into the furnace together with the rubbish will immediately proceed to melt as they slide down hearth 1 and drop onto melting hearth 3 where the melting will be completed and the molten steel or iron will become a part of the fluid molten slag which will be continually draining out through tap out hole 12 and dropping into receiving hopper 57 of slag discharge conveyor 22 in quench tank 15. As the molten slag drops into the water in the quench tank, each droplet of molten slag will almost explosively freeze and shatter into many small crystalline particles which, through the slag discharge conveyor 22 will form a continuous discharge of a black, granular, homogeneous slag material of a crystalline structure and which is completely pure and sanitary in every respect. Any glass bottles or other glass items charged will quickly melt and proceed into the molten slag on melting hearth 3 as described for the steel.

(III) *Built-in high temperature flue gas scrubber*

The combustible materials being burned in suspension in combustion volume 56 always contain a certain percentage of non-combustible materials which, when the combustion as such has been completed will be suspended in the stream of hot flue gases as fly ash. If this fly ash is heated to a sufficiently high temperature, it will melt and if it touches refractory walls which are at a sufficiently high temperature it will form molten slag. This layer of molten slag on refractory, which is a very severe if not the most severe problem in the construction and operation of conventional incinerating furnaces, has a very sticky consistency and therefore has a great ability to catch and hold on to other fly ash particles which might touch it in passing by. In all other incinerating furnaces this problem is so severe that some furnaces must be shut down every day and several tons of slag be chipped out with air hammers and carried manually out of the furnace to be hauled away to the dump. This, of course, makes it impossible for these furnaces to operate on a truly continuous 24 hour basis as they were intended for and the very removal by mechanical means of the frozen slag from the brick walls is very hazardous to the service life of the linings, since often large portions of brick walls adhere so strongly to the slag that is being removed that the walls are removed as well, requiring expensive and time consuming repairs. In order to combat this problem in all prior art incinerating furnaces, temperatures of the combustion in the combustion zone and on the grates carrying the charge of refuse through the combustion zone are kept so low that the glasses and the other non-combustibles in the charge will not melt and form slag but will proceed through the furnace unaffected. This very feature, of course, makes for inefficient combustion since combustion temperatures often are maintained between 1200° and 1400° or 1600° F. resulting in very large production of smoke and large pieces of unburned paper and other light materials in the flue gas stream going out the stack. Also due to this very incomplete combustion in many cases, very large quantities of carbon monoxide, CO, with its well known health hazards are discharged through the flue stacks. As a result of tightening of air pollution control codes all over the country dry and wet scrubbers are employed in most of the existing incinerating plants for the purpose of cleaning the flue gases being discharged from the poorly operating combustion chambers. As a direct result of this very poor combustion such large quantities of fly ash and unburned particles from the refuse charges are cleaned out of the flue gases in these cleaning systems, that the very handling of these residues itself becomes a very severe problem giving the owners and operators of these plants good reason to try to avoid this cleaning process as much as possible. Due to the particular shape and design of my furnace, tremendously high spinning velocities are obtained of the flue gases as they tend to rise toward the throat section 9 at the top of the roof in the combustion chamber 56. The 1100 HP total accumulated energy provided by the five fans 23 and 30 imparts so much centrifugal force to the spinning flue gases that nearly all solid matter particles will be forced against the very hot refractory surfaces of the roof 4 where these particles will adhere to the molten layer of slag and together with this slag will melt and run down the combustion chamber hearth 1 and proceed to the melting hearth 3 and tap out block 12 together with the rest of the molten slag in the furnace. The clean flue gases will escape through the center section of throat 9 up through stack 11 and through scrubbers 51 at the top of the stack if further cleaning is necessary.

The bottom 5 of charging hopper 6 together with the entire lower section of the furnace comprised of walls 1 and 2 and bottom 3 with plenum chambers 37 and 22 attached are all rotatably supported through ring shaped rail 34 on six steel wheels 35. These wheels which are supported on axles 36 and bearings 37 are all driven through gear boxes 39 by motors 38 at continuously variable speeds throughout the entire speed range required for proper operation of the rotating hearth of the furnace. The slag discharge conveyor 22 is suspended from structural members attached to the bottom section of the furnace whereby it will be carried around at the same speed as the rotation of the furnace above but submerged in the quench tank continually, and with receiving hopper 57 always maintaining alignment with the discharge stream of molten slag issuing from slag tap out 12. Driving wheel 58 at the end of the conveyor shaft will rest on the bottom of quench tank 15 as the conveyor is being moved in relation to the quench tank, whereby wheel 58 will be driven by friction against the bottom of the quench tank and thus impart rotational motion to the conveyor screw inside the conveyor to move the granulated slag material up and out of the quench tank, discharging it through discharge spout 59 onto conventional conveyor means for bringing the slag material to trucks waiting above.

(IV) *Automatic complete 2-way temperature control*

In order to maintain the proper air fuel temperature balance within combustion chamber 29 to assure proper and complete combustion of all of the combustible materials charged into the furnace and also melting of the non-combustibles, natural gas is being supplied through gas line 18 through flexible connector 20 and discharged into combustion chamber volume through gas discharge nozzles 21. During periods of high production requirements of the furnace for incineration of rubbish and other materials such as described the gas supply will be completely shut off and only the necessary air will be provided to achieve perfect combustion. In order to maintain the proper incinerating conditions within the furnace volume during low production periods thermocouples, inserted through the refractory walls at many places in the furnace will cause automatic temperature control equipment to open motorized valves in the gas line to admit the proper amount of gas to maintain temperatures in the range between 2500° F. and 3000° F. within the combustion chamber 29. For this purpose the volume and pressure of the air delivered by all of the five fans involved are accurately controlled by automatic temperature controls as well.

CONTROL ROOM

The operation of all pieces of equipment in the entire plant are preferably monitored and controlled from a single centrally located control room 48 constructed as a donut-shape around the centrally located stack and supported in the roof trusses 46 above the operating floor of the plant. The control room has a high window 50 which extends all around the entire circumference along the outer wall of the room giving the operator a complete and unobstructed view of the entire operating floor and charging facilities of the furnace. It enables him to see all of the charging doors and control the opening and closing of the doors and it enables him to have a full view of the loads discharged by every truck coming into the plant. It is anticipated that 16 truck scales will be installed in the surface of the tipping floor, one at each dumping location around the circumference of steel bumper 45. By having scales arranged in this manner it would be possible to avoid stopping the trucks on their way in or out of the plant and also to obtain the full weight and the empty weight of the same truck on the same weight ticket without ever having moved he truck which will eliminate the possible dispute of whether a certain tare weight of a truck applies to the empty weight and dumping rate charged for that same truck. The scale reading equipment and dials and printing equipment will all be located at the operators platform in the control room and together with an automatically operated camera located in the ceiling in front of the truck which will automatically take a picture of the truck license number at the same time the scales are energized and print the gross weight, the net weight and the tare weight of the load, together with the date and the time on the weight ticket which will be kept on file in the accounting office for future reference. All of the necessary control equipment and instruments are mounted in control panels 49 located on the central circular wall of the control room 48. All the temperatures of the various points of the furnace and stack as well as the air temperatures from the fans, the water temperatures in the tank and the various water lines will be continually monitored and recorded where necessary. The rotational speed of the furnace hearth as well as that of each of the drives 38 and 39 and the rotational speeds of all of the fans 23 and 30 are preferably continually monitored and interlocked with safety systems and alarms to advise the operators if any component should wander outside of its safe operating range. Stairways 60 and 61 provide access from the operating floor to the control room and landing 63 serves also as a catwalk all around the stack for maintenance purposes.

A high pressure steam boiler 80 (chain line) may be installed in the stack 11. The present invention is particularly suited for such structures because of the high temperatures and cleanliness of the flue gases rising upwardly through the stack 11. A boiler installation adapted to reduce flue gas temperatures to about 600° F. at the discharge end of the boiler tube section would be particularly desirable. Such an installation could produce approximately 200,000 to 300,000 lb./hr. of steam at 650° F. and 600 to 700 lb. pressure from the combustion of approximately 80 tons of refuse/hr. in the furnace below.

Such added recovery of heating values is a bonus to operators of my invention and provides large quantities of power for use or sale.

While I have illustrated and described a presently preferred practice and embodiment of my invention, it will be understood that this invention may be otherwise embodied within the scope of the following claims.

I claim:

1. An incinerator for garbage and refuse comprising a rotatable hearth having a central well portion, means for rotating said hearth, air inlet means into said hearth, means for delivering air under pressure to said air inlet means, roof means over said hearth, said roof means having an outlet for combustion gases, hopper means between said roof means and hearth receiving refuse to be burned and continuously delivering said refuse into the hearth, means for selectively delivering a gaseous combustion agent into said hearth and means in the well for discharging liquid products from combustion.

2. An incinerator as claimed in claim 1 wherein the hearth is of conical shape.

3. An incinerator as claimed in claim 1 having quench means beneath the well receiving the products of incineration to quench and disintegrate them.

4. An incinerator as claimed in claim 1 wherein the roof means is provided with a heat-exchanger boiler.

5. An incinerator as claimed in claim 1 having air inlet means directing air tangentially into the hearth adjacent the bottom and at the intersection of hearth and roof means.

References Cited

UNITED STATES PATENTS 2,171,538   9/1939   Black et al. _____ 110—13

FOREIGN PATENTS 5,206   Great Britain.
of 1915
218,804   7/1924   Great Britain.

JAMES W. WESTHAVER, *Primary Examiner.*